United States Patent
Shapira et al.

(10) Patent No.: US 12,381,714 B2
(45) Date of Patent: Aug. 5, 2025

(54) DATA COMPRESSION AND ENCRYPTION ALGORITHM

(71) Applicants: ARIEL SCIENTIFIC INNOVATIONS LTD., Ariel (IL); BAR-ILAN RESEARCH AND DEVELOPMENT COMPANY LTD., Ramat Gan (IL)

(72) Inventors: Dana Shapira, Modiin (IL); Shmuel Tomi Klein, Rehovot (IL)

(73) Assignees: ARIEL SCIENTIFIC INNOVATIONS LTD., Ariel (IL); BAR-ILAN RESEARCH AND DEVELOPMENT COMPANY LTD., Ramat Gan (IL)

( * ) Notice: Subject to any disclaimer, the term of this patent is extended or adjusted under 35 U.S.C. 154(b) by 385 days.

(21) Appl. No.: 17/794,979

(22) PCT Filed: Jan. 24, 2021

(86) PCT No.: PCT/IL2021/050073
§ 371 (c)(1),
(2) Date: Jul. 24, 2022

(87) PCT Pub. No.: WO2021/149060
PCT Pub. Date: Jul. 29, 2021

(65) Prior Publication Data
US 2023/0086206 A1 Mar. 23, 2023

Related U.S. Application Data

(60) Provisional application No. 62/965,170, filed on Jan. 24, 2020.

(51) Int. Cl.
*H04L 9/08* (2006.01)
*H03M 7/40* (2006.01)
*H04L 9/30* (2006.01)

(52) U.S. Cl.
CPC .......... *H04L 9/0825* (2013.01); *H03M 7/40* (2013.01); *H04L 9/3073* (2013.01)

(58) Field of Classification Search
CPC ....... H04L 9/0825; H04L 9/3073; H03M 7/40
See application file for complete search history.

(56) References Cited

U.S. PATENT DOCUMENTS 6,122,378 A * 9/2000 Yoshiura ............ G11B 20/0021
380/37
6,411,714 B1 * 6/2002 Yoshiura .......... G11B 20/00007
708/203

(Continued)

OTHER PUBLICATIONS

Klein, S. T., & Shapira, D. (2020). Integrated encryption in dynamic arithmetic compression. Information and Computation, 279: 104617. doi:10.1016/j.ic.2020.104617.

(Continued)

*Primary Examiner* — Techane Gergiso
(74) *Attorney, Agent, or Firm* — The Roy Gross Law Firm, LLC; Roy D. Gross

(57) ABSTRACT

A method for a compression scheme comprising encryption, comprising: receiving, as input, data comprising a plurality of data elements; constructing a Huffman tree coding representation of the input data based on a known encryption key, wherein the Huffman tree comprises nodes that are compression codes having compression code lengths corresponding to respective occurrence probabilities of the data elements, and wherein the encryption key specifies a subset of the nodes to be selected for an encryption process; selecting the subset of nodes in the Huffman tree for the encryption process, based on the encryption key; applying, to each sub-tree of the Huffman tree that is rooted at one of the nodes in the subset, a specified transformation, based on the encryption key; and generating an output data file based, at least in part, on the applying.

12 Claims, 14 Drawing Sheets

(56) References Cited

U.S. PATENT DOCUMENTS

| | | | | |
|---|---|---|---|---|
| 10,135,463 B1* | 11/2018 | Satpathy | ............. | H03M 7/6023 |
| 10,587,399 B2* | 3/2020 | Fernandez | .......... | G06F 21/6254 |
| 10,601,443 B1* | 3/2020 | Tourani | ............... | H03M 7/4037 |
| 2004/0076299 A1 | 4/2004 | Wang | | |
| 2004/0223608 A1* | 11/2004 | Oommen | .............. | H04L 9/0656 |
| | | | | 380/28 |
| 2010/0067688 A1* | 3/2010 | Au | .......................... | H04N 19/61 |
| | | | | 380/42 |
| 2010/0310065 A1* | 12/2010 | Chang | ................. | H04N 21/2347 |
| | | | | 713/193 |
| 2015/0086013 A1 | 3/2015 | Metzler et al. | | |
| 2017/0366198 A1 | 12/2017 | Wu et al. | | |
| 2019/0140658 A1* | 5/2019 | Cooper | ............... | H03M 7/3084 |

OTHER PUBLICATIONS

Lin, Q., Wong, K.-W., & Chen, J. (2013). An enhanced variable-length arithmetic coding and encryption scheme using chaotic maps. Journal of Systems and Software, 86(5), 1384-1389. doi:10.1016/j.jss.2013.01.012.

Syed et al., A Compression and Encryption Algorithms on DNA Sequences Using R2CP And Modified Huffman Technique, International Journal of Computer Applications (0975-8887), vol. 57, No. 1, Nov. 2012.

Md. S. M. Hossein. A Compression and Encryption Algorithms on DNA Sequences using R/\2CP and modified Huffman Technique. International Journal of Computer Applications 57(1):1-10, Nov. 2012. doi: 10.5120/9075-6994.

Kullback, S., & Leibler, R. A. (1951). On Information and Sufficiency. The Annals of Mathematical Statistics, 22(1), 79-86. doi:10.1214/aoms/1177729694.

PCT International Search Report for International Application No. PCT/IL2021/050073, mailed May 5, 2021, 5pp.

PCT Written Opinion for International Application No. PCT/IL2021/050073, mailed May 5, 2021, 5pp.

PCT International Preliminary Report on Patentability for International Application No. PCT/IL2021/050073, issued Jul. 26, 2022, 6pp.

* cited by examiner

MIRROR

ORIGINAL

DATA COMPRESSION AND ENCRYPTION ALGORITHM

CROSS-REFERENCE TO RELATED APPLICATIONS

This application is a National Phase of PCT Patent Application No. PCT/IL2021/050073 having International filing date of Jan. 24, 2021, which claims the benefit of priority of U.S. Provisional Application Ser. No. 62/965,170, filed Jan. 24, 2020, the content of which is incorporated by reference herein by reference in its entirety.

FIELD OF THE INVENTION

The invention relates generally to the field of computer data encryption and compression.

BACKGROUND

Transmitting data over a communication network is challenged by processing rate, increasing throughput, and most importantly, by protecting the underlying data. With the increasing number of cyber-attacks and threats, these goals become all too necessary when dealing with enormous amounts of delicate information. Combining compression and encryption methods can overcome these challenges by representing the data compactly and in a secure format. Compression cannot be applied on encrypted data, because the latter usually cannot be distinguished from a randomly generated file. Therefore, when both compression and encryption are desired, compression cannot be applied after encryption, only before or simultaneously with encryption.

Most existing solutions perform the tasks sequentially. Simultaneous compression and encryption, forming so-called Compression Cryptosystems, can be achieved by either embedding compression into encryption algorithms, or by adding cryptographic features into the compression scheme.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a system comprising at least one hardware processor; and a non-transitory computer-readable storage medium having stored thereon program instructions, the program instructions executable by the at least one hardware processor to: receive, as input, data comprising a plurality of data elements, construct a Huffman tree coding representation of the input data based on a known encryption key, wherein the Huffman tree comprises nodes that are compression codes having compression code lengths corresponding to respective occurrence probabilities of the data elements, and wherein the encryption key specifies a subset of the nodes to be selected for an encryption process, select the subset of nodes in the Huffman tree for the encryption process, based on the encryption key, apply, to each sub-tree of the Huffman tree that is rooted at one of the nodes in the subset, a specified transformation, based on the encryption key, and generate an output data file based, at least in part, on the applying.

There is also provided, in an embodiment, a method comprising: receiving, as input, data comprising a plurality of data elements; constructing a Huffman tree coding representation of the input data based on a known encryption key, wherein the Huffman tree comprises nodes that are compression codes having compression code lengths corresponding to respective occurrence probabilities of the data elements, and wherein the encryption key specifies a subset of the nodes to be selected for an encryption process; selecting the subset of nodes in the Huffman tree for the encryption process, based on the encryption key; applying, to each sub-tree of the Huffman tree that is rooted at one of the nodes in the subset, a specified transformation, based on the encryption key; and generating an output data file based, at least in part, on the applying.

There is further provided, in an embodiment, a computer program product comprising a non-transitory computer-readable storage medium having program instructions embodied therewith, the program instructions executable by at least one hardware processor to: receive, as input, data comprising a plurality of data elements; construct a Huffman tree coding representation of the input data based on a known encryption key, wherein the Huffman tree comprises nodes that are compression codes having compression code lengths corresponding to respective occurrence probabilities of the data elements, and wherein the encryption key specifies a subset of the nodes to be selected for an encryption process; select the subset of nodes in the Huffman tree for the encryption process, based on the encryption key; apply, to each sub-tree of the Huffman tree that is rooted at one of the nodes in the subset, a specified transformation, based on the encryption key; and generating an output data file based, at least in part, on the applying.

In some embodiments, the Huffman tree is constructed in a non-deterministic way.

In some embodiments, the specified transformation is selected from the group consisting of: mirror transformation, swap transformation, and level-swap transformation.

In some embodiments, the specified transformation maintains a length of a compression code associated with each of the nodes in the subset.

In some embodiments, the selecting is based on pairing the nodes in the subsets with 1-bits in the encryption key.

In some embodiments, the Huffman tree is one of: statically constructed, and dynamically constructed.

In some embodiments, a number of the nodes in the subset is selected based, at least in part, on a desired security level of the encryption.

In some embodiments, the data comprises a specified data element which is inserted in the input data a random positions.

There is further provided, in an embodiment, a system comprising at least one hardware processor; and a non-transitory computer-readable storage medium having stored thereon program instructions, the program instructions executable by the at least one hardware processor to: receive, as input, data comprising a plurality of data elements, partition a current output interval of the input data into sub-intervals, wherein a size of each of the sub-intervals corresponds to an occurrence probability of a corresponding data element of the plurality of data elements, apply a specified transformation to a subset of the sub-intervals, wherein the transformation modifies an ordering of the sub-intervals, based on a known encryption key, and generate an output data file based, at least in part, on the applying.

There is further provided, in an embodiment, A method comprising: receiving, as input, data comprising a plurality of data elements; partitioning a current output interval of the input data into sub-intervals, wherein a size of each of the sub-intervals corresponds to an occurrence probability of a corresponding data element of the plurality of data elements; applying a specified transformation to a subset of the sub-intervals, wherein the transformation modifies an ordering of the sub-intervals, based on a known encryption key; and generating an output data file based, at least in part, on the applying.

There is further provided, in an embodiment, A computer program product comprising a non-transitory computer-readable storage medium having program instructions embodied therewith, the program instructions executable by at least one hardware processor to: receive, as input, data comprising a plurality of data elements; partition a current output interval of the input data into sub-intervals, wherein a size of each of the sub-intervals corresponds to an occurrence probability of a corresponding data element of the plurality of data elements; apply a specified transformation to a subset of the sub-intervals, wherein the transformation modifies an ordering of the sub-intervals, based on a known encryption key; and generate an output data file based, at least in part, on the applying.

In some embodiments, the specified transformation is selected from the group consisting of: mirror transformation and swap transformation.

In some embodiments, the occurrence probability is not updated during the partitioning.

In some embodiments, the occurrence probability is dynamically updated during the partitioning, based on an occurrence probability of the data elements which have been partitioned.

In some embodiments, the subset is selected based, at least in part, on the occurrence probability of each of the data elements.

In some embodiments, a number of the sub-intervals in the subset is selected based, at least in part, on a desired security level of the encryption.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1B:
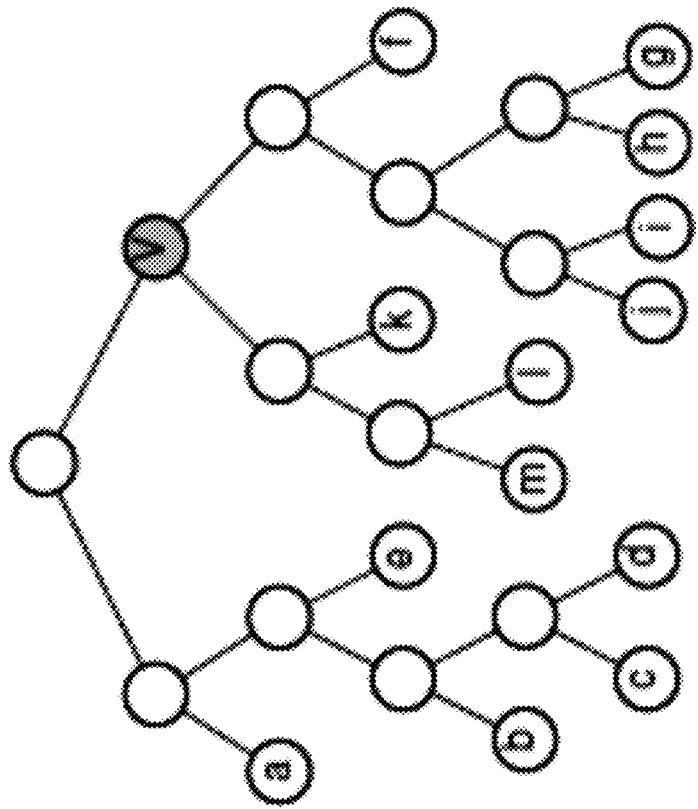
FIGS. 1A-1C illustrates specified transformations which may applied by the present algorithm, according to some embodiments of the present disclosure.

Disclosed are a system, method, and computer program product which provide for a compression scheme comprising encryption.

In some embodiments, an output of a compression/encryption algorithm of the present disclosure (denoted herein interchangeably a crypto-compression algorithm, a compression crypto-algorithm, or a compression crypto-system), is a both reduced in space and secure against unauthorized decoding.

In some embodiments, an algorithm of the present disclosure provides for encryption which does not affect a compression ratio of the output. Thus, in some embodiments, the present algorithm provides for encrypting data while retaining the same compression ratio of the compression algorithm as without encryption. In some embodiments, the present algorithm retains the same model and distributions as the compression method it is based on, while using an encryption key to control which of the many possible encodings to be chosen, wherein decoding of the resulting ciphertext is infeasible without knowledge of the key.

In some embodiments, the present algorithm applies repeatedly minor changes to the compression model, without affecting its optimality. The cumulative impact of a large number of such changes leads to completely different ciphertexts, which can be decoded only if an encryption key is known.

A potential advantage of the present disclosure is, therefore, in that is provides for simultaneous compression and encryption, to ensure security features of the resulting output, without negatively affecting compression efficiency.

Compression and Encryption Using Static Huffman Coding

In some embodiments, the present algorithm provides for Huffman compression coding. Huffman coding provides an optimum coding performance when individual information symbols are to be represented as individual codewords. The output from a Huffman coding algorithm can be viewed as a variable-length code table for encoding a source symbol (such as a character in a file). The algorithm derives this table from the estimated probability or frequency of occurrence (weight) for each possible value of the source symbol. As in other entropy encoding methods, more common symbols are generally represented using fewer bits than less common symbols.

In some embodiments, a data file may be received for compression. In some embodiments, the input file may be been partitioned into elements to be encoded, e.g., characters or words or other strings. This partition process yields a probability distribution for the set of elements. An internal node v of the corresponding Huffman tree is selected according to an encryption key, which is assumed to have been exchanged between the encoder and decoder prior to the coding phases. Any node v of a Huffman tree (or in fact, the tree of any prefix code) is associated with the string obtained by concatenating the labels on the edges on the path from the root to v, where left and right edges are labelled 0 and 1, respectively.

In some embodiments, a specified transformation may then be applied on the subtree rooted by the selected node v, making sure that all the codeword lengths remain the same, so that the present algorithm preserves the optimal compression ratio of Huffman encoding of the original file. The cumulative impact of several consecutive such transformations is to produce completely different output files, yet all of optimal minimal length.

Figure 1A:
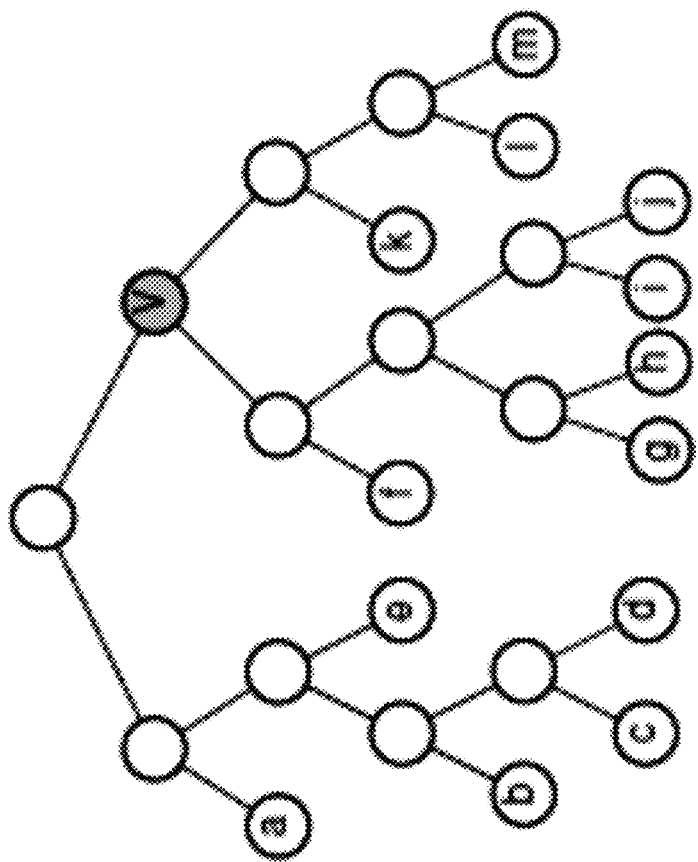
Figure 1C:
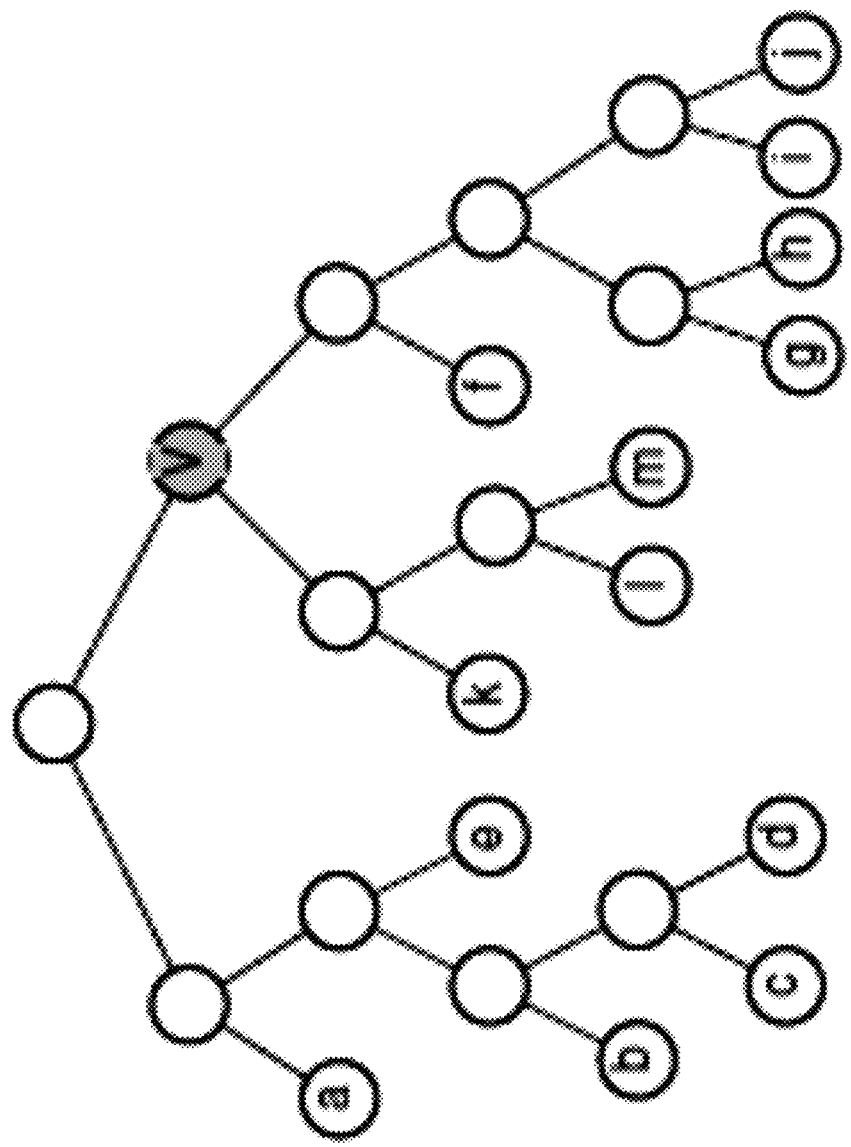

FIGS. 1A-1C illustrates specified transformations which may applied by the present algorithm. In some embodiments, specified transformations which may applied by the present algorithm may include, but are not limited to:

Mirror transformation: The whole tree rooted at v is replaced by its mirror image. As example, consider the original tree shown in FIG. 1A, comprises a node as the selected internal node v. Its mirror transformation is shown in FIG. 1B. As a result, the codewords corresponding to leaves of the tree rooted at v are transformed from $\alpha\beta$ to $\alpha\bar{\beta}$, where $\alpha$ is the string corresponding to v, $\beta$ is the suffix of a specific codeword before the swap, and $\bar{\beta}$ is the 1's complement of $\beta$. In the present example, the chosen node v corresponds to $\alpha=1$ and the codeword 10110 assigned to leaf i is transformed into $1\overline{0110}=11001$.

Swap transformation: Interchange only the left and right subtrees of the internal node v, without continuing recursively to the subtrees as done in the mirror variant above. In the present example, the original Huffman tree is transformed into FIG. 1C. That is, the codeword $\alpha\beta\gamma$ is converted to $\alpha\bar{\beta}\gamma$, where $\alpha$ and $\gamma$ are strings and $\beta$ is a single bit. For the same example as above, 10110 turns into $1\bar{0}110=11110$.

In some embodiments, either of these transformations may be applied any consecutive number of times to the input data, separately or in combination, and even selectively according to an additional bit of the encryption key, in order to achieve a better shuffling of the encoded bits and thereby better encryption for the model, while preserving the lengths of all codewords.

Accordingly, in some embodiments, given input data (e.g., text) $T=x_1 x_2 \ldots x_n$ to be compressed and encrypted, where the $x_i$ are characters belonging to some alphabet $\Sigma$ of size $\sigma$, the Crypto-Huffman encoding algorithm uses initially the Huffman tree of a static encoding, which may be a Huffman tree T that was constructed by a non-deterministic process. In some embodiments, in a deterministic implementation, when processing pairs of weights, the smaller weight is always assigned to the same side (left or right subtree of the current node), which may bias the overall distribution of the bits using this encoding. The non-deterministic creation of the Huffman tree tends to balance the occurrences of these 0 and 1 bits, as it can also be seen as using an initialization process that processes the internal nodes of a static Huffman tree, deciding randomly whether or not to swap the subtrees of the following node.

An additional parameter of the encryption process is an integer k, chosen in the range $1 \leq k \leq \alpha$. After a character $x_i$ has been read, the corresponding codeword is output to the encoded file. Then, k different internal nodes $(v_1, \ldots, v_k)$ are chosen according to an encryption key, and a transformation on the subtree of T rooted at node $v_i$ is applied, for $1 \leq i < k$. The objective of the parameter k to provide the ability to control the trade-off between security and time complexity. The formal generic Huffman cryptosystem (denoted Crypto-Huffman) is presented in Algorithm 1 below. The decoding algorithm is symmetrical.

---

Algorithm 1: Crypto-Compression by Huffman - Encoding

Crypto-Huffman-Encode $(x_1 x_2 \ldots x_n, k, \mathcal{K})$
1  initialize the model
2  for i ← 1 to n do
3      encode $x_i$ according to the current Huffman tree T
4      use encryption key $\mathcal{K}$ to select k different internal nodes $(v_1, \ldots, v_k)$
        in T
        for i ← 1 to k do
5            apply transformation on $v_j$ in T

---

Figure 2A:
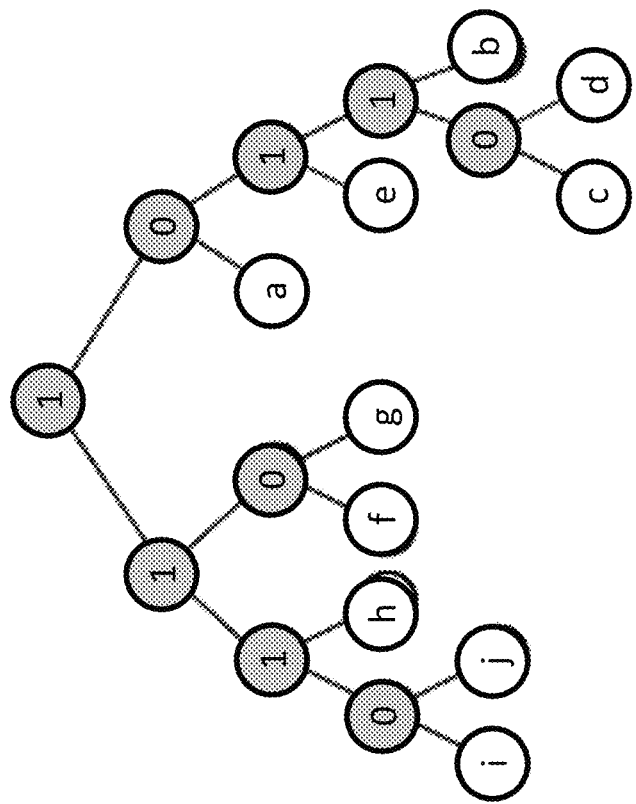
FIG. 2A illustrates a Bulk-Crypto-Huffman variant of the present algorithm, according to some embodiments of the present disclosure.
Figure 2A:
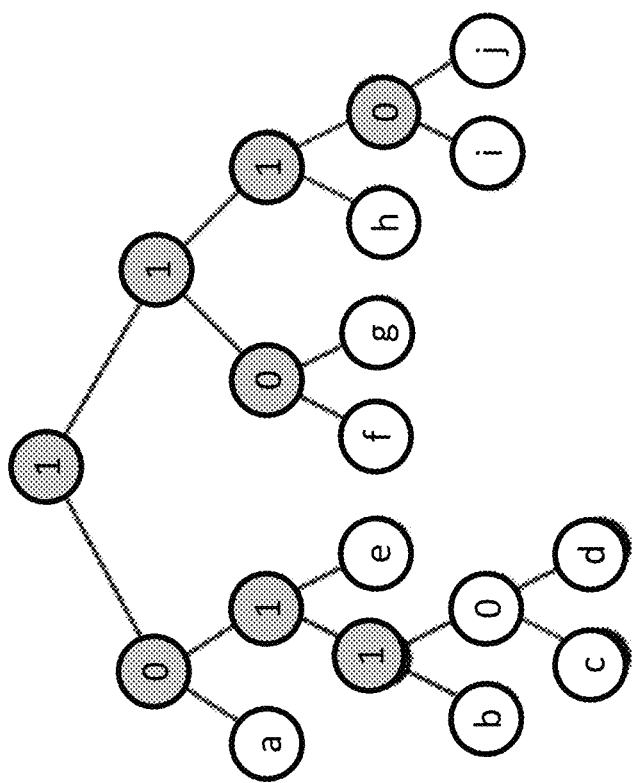

In some embodiments, the present algorithm can be generalized to a non-constant k. Thus, instead of explicitly pointing to the k internal nodes on which the transformations should be applied, which requires k log a bits from the encryption key, $\sigma-1$ bits may be used. The present then indicates at each internal node whether or not to apply the transformation. The $\sigma-1$ following bits of the encryption key are then used to refer to the internal nodes of T in some order. The transformation will be applied only to those internal nodes that are paired with 1-bits. This variant may be denoted Bulk-Crypto-Huffman. FIG. 2A illustrates this version on a specific tree corresponding to 101101100. The left tree is the original one, assigning certain bits of the encryption key to individual nodes. In this example, it is assumed that these bits of the encryption key are 101101100, and are assigned in a top-down, left-right manner. The right tree of FIG. 2 shows the resulting tree after applying a swap to every node that corresponds to a 1-bit.

Figure 2B:
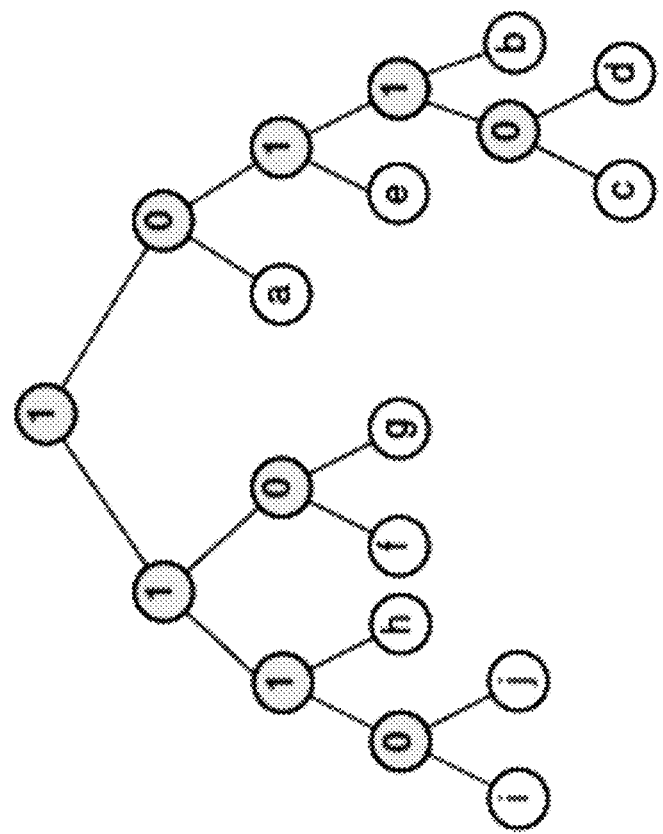
FIG. 2B illustrates a Rand-Crypto-Huffman variant of the present algorithm, according to some embodiments of the present disclosure.
Figure 2B:
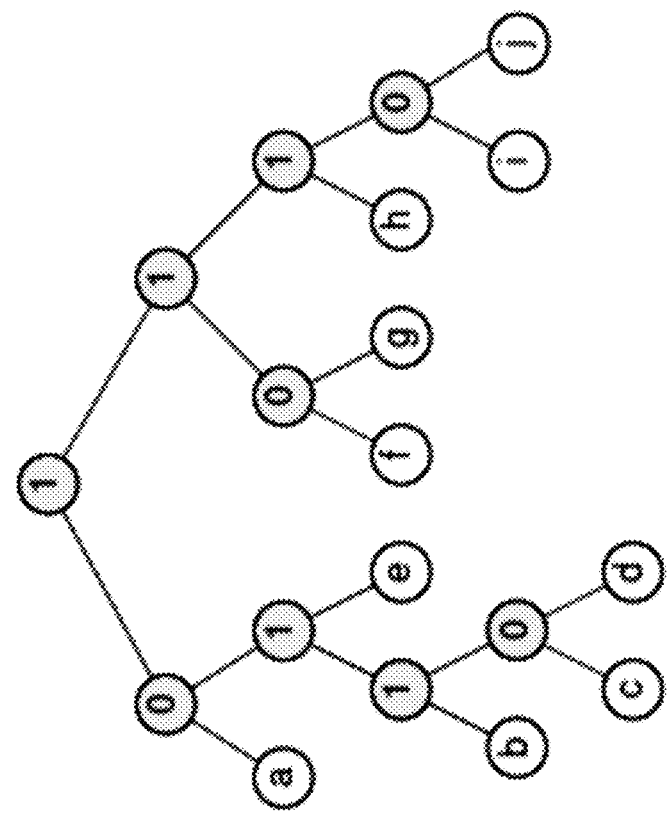

In some embodiments, the present algorithm can be generalized to a non-constant k as follows. The $\Sigma-1$ subsequent bits of the encryption key are used to refer to the $\Sigma-1$ internal nodes of the Huffman tree. The transformation will be applied only to those internal nodes that are paired with 1-bits. Therefore, k is the number of 1-bits among the following $\Sigma-1$ bits of the encryption key, which may vary. This variant may be denoted Rand-Crypto-Huffman. FIG. 2B illustrates this version on a specific tree. The left tree is the original one, assigning certain bits of the secret key to individual nodes. In this example the bits of the secret key are 101101100, and are assigned in a top-down, left-right manner. The right tree of FIG. 2B shows the resulting tree after applying a swap to every node that corresponds to a set bit.

The mirror and swap transformations might be easy to implement, as basic operations, but they can only produce $2^{\sigma-1}$ permutations for the a leaves of the tree, which is much less than the $\sigma!$ possible permutations. As example, referring to FIG. 2, the leaves for f and g remain siblings no matter what series of mirror and swap transformations has been applied. In fact, the number of permutations to be considered depends on the shape of the optimal tree. For a full tree, having all a leaves on the same level, there are indeed $\sigma!$ permutations. On the other hand, if the optimal tree turns out to be degenerate, that is, with one leaf on level i for $1 \leq i < \sigma-1$, and two leaves on the lowest level $\sigma-1$, then only $2^{\sigma-1}$ permutations are possible.

The following operation overcomes this constraint and generalizes the two extreme cases above by applying swaps to any pair of adjacent nodes within the same level, and not only siblings. The transformation still retains the codeword lengths, thus the compression efficiency is not negatively affected.

Figure 3:
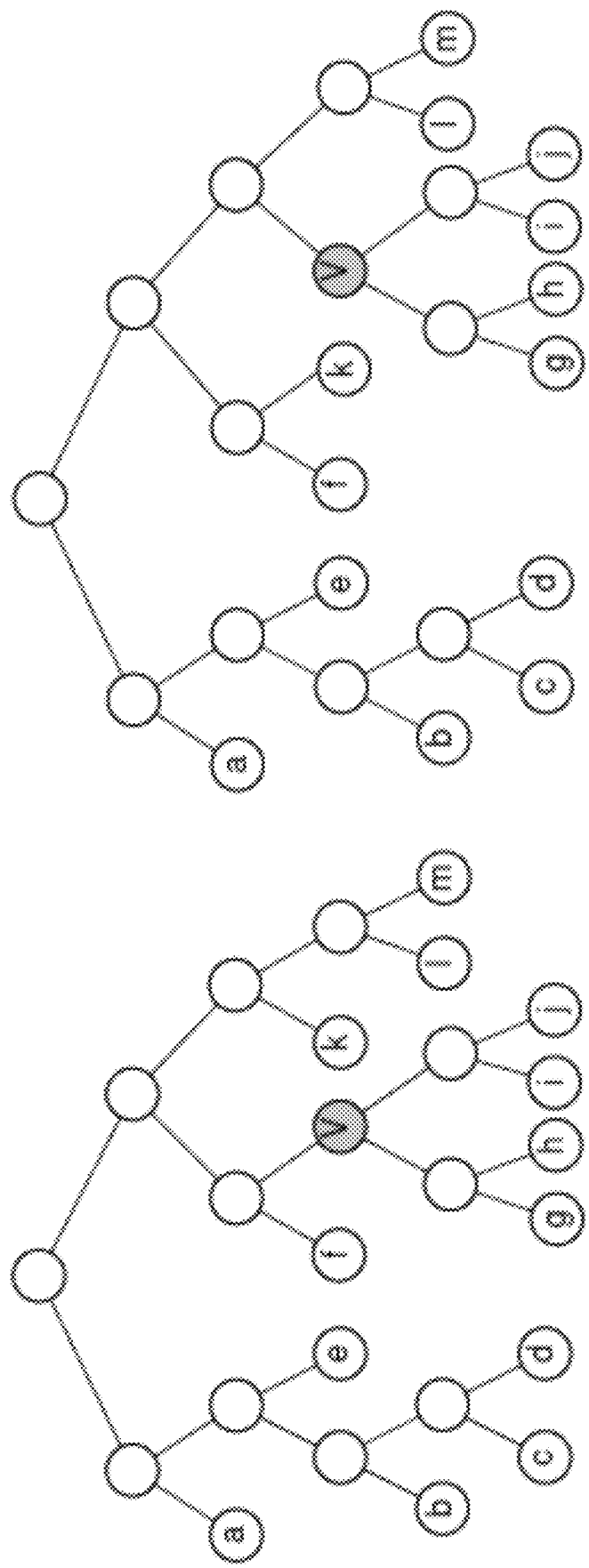
FIG. 3 illustrates an example of the level-swap-Huffman variant, corresponding to 10110 and 11010, according to some embodiments of the present disclosure.

Accordingly, in some embodiments, the present disclosure may provide for specified transformations which may applied by the present algorithm and may include, but are not limited to:

Level-swap transformation: Consider all the nodes, leaves and internal, within the same level i, for i>0, as belonging to a cyclic linked list. Interchange subtrees rooted at a node v with the node right(v) to its right, on the same level. In particular, the rightmost node is exchanged with the leftmost. An example is given in FIG. 3, where the original Huffman tree on the left is transformed into the one on the right. That is, the codewords $\alpha_1\beta$ and $\alpha_2\gamma$ are transformed into $\alpha_2\beta$ and $\alpha_2\gamma$, respectively, where $\alpha_1$ and $\alpha_2$ are the strings corresponding v and right(v) so that $|\alpha_1|=|\alpha_2|=1$, and $\beta$ and $\gamma$ are suffixes of specific codewords corresponding to leaves in the subtrees rooted by v and right(v) before the swap. For the example of FIG. 3, 10110 turns into 11010 for $\beta=10$ and 110 turns into 101 for $\gamma$=empty string.

In some embodiments, When combining k level-swap transformations, the resulting Huffman tree depends on the order the k nodes have been selected. Performing the same operations in a different order is likely to produce different trees, in contrast to the first two transformations in which any order of the same selected k nodes results in the same output Huffman tree. Consequently, selecting the k vertices using k log a bits strengthens the encryption, as compared to a single level-swap, more than using the same number of bits for k swap and mirror operations.

Security and Resistance to Cipher Attacks

The meta-data necessary for the decoding of the ciphertext is often stored in a header. For static compression techniques, this header may consist of the probability distribution, the exact frequencies, or even the entire tree structure. Moreover, decryption attempts can be based on known statistics of occurrences of the alphabet symbols in natural languages. These statistics may lead to guessing the codeword lengths with high probability, thereby inducing a much smaller number of possible partitions of the ciphertext into codewords, so that exhaustively checking all such partitions cannot be ruled out. To counteract such attacks, it has been proposed to insert random bits at randomly selected positions, which is cryptographically secure in the sense that the problem of guessing the code in such a setting is shown to be an NP-complete problem.

Accordingly, in some embodiments, the present disclosure provides for an enhancement to increase the security of the present algorithm. In some embodiments, in order to cope with CPA attacks, the present disclosure defines a new element DC, denoting a 'don't-care' element, and adjoins it to the alphabet to yield $\Sigma'=\Sigma\cup DC$. The goal is to produce different ciphertexts, even in case the same encryption key is used to encrypt the same message. This DC element is repeatedly inserted to the input file at randomly chosen positions. Static Huffman coding requires the exact probability distribution in order to construct an optimal encoding. This information may be obtained by a double pass over the input file. To avoid this two-pass process, one can use the adaptive variant where both the encoder and the decoder maintain, independently, a copy of the current Huffman tree, which is based on the probability distribution of the elements in the already processed portion of the file. Instead of reconstructing the Huffman tree from scratch after each stage, one can use a more efficient update method, as known to those skilled in the art. There seems to be an inherent weakness in the crypto-security of using static Huffman encoding, even in the presence of randomly inserted DCs. If two encoding attempts of the same text and using the same encryption key are considered, wherein the only positions that differ are the locations of the DCs, the result may be identical outputs on all ranges for which the number of inserted DCs is equal for the two encodings. This weakness could be exploited by an adversary in a crypto-attack. Note that the matching parts disappear as soon as dynamic Huffman coding is used, because the codewords assigned to the different characters constantly change.

In some embodiments, the number of DC elements that should be inserted. This number should balance the effort of not increasing the size of the text significantly, and the need to enhance security with a sufficient number of DCs. Accordingly, in some embodiments, the present disclosure provides for inserting of DC elements according to a stochastic process controlled only by the encoder, and independent of the encryption key K. In some embodiments, this is enabled because the decoder does not need to know in advance where the DCs are inserted, and will recognize them after they are decoded. At position i in the text to be generated, $1 \leq i \leq n$, the DC element is added with probability $$\frac{\log(i+1)}{ci},$$

where c>1 is a constant controlling the total number of inserted DCs.

In some embodiments, the expected distance between successive occurrences of DCs at position i may be approximated by $$\frac{ci}{\log(i+1)},$$

as if using a constant probability between successive insertions of DCs.

In some embodiments, the overall expected distance between DCs for the entire range is then $$E = \frac{1}{n}\Sigma_{i=1}^{n} \frac{ci}{\log(i+1)} = \theta\left(\frac{n}{\log n}\right).$$

To see this, E may be bound on both sides:

$$E \geq \frac{1}{n}\sum_{i=1}^{n} \frac{ci}{\log(n+1)} = \frac{c}{n\log(n+1)}\sum_{i=1}^{n} i = \frac{c(n+1)}{2\log(n+1)} = \Omega\left(\frac{n}{\log n}\right).$$

On the other hand, $$E \leq \frac{1}{n}\sum_{i=1}^{\sqrt{n}} \frac{ci}{\log(i+1)} + \frac{1}{n}\sum_{i=\sqrt{n}+1}^{n} \frac{ci}{\log(i+1)} \leq \frac{c}{n}\sum_{i=1}^{\sqrt{n}} i + \frac{c}{n} \leq$$

$$\frac{1}{n}\sum_{i=\sqrt{n}+1}^{n} \frac{n}{\log(\sqrt{n})} = \frac{c\sqrt{n}(\sqrt{n}+1)}{2n} + \frac{c}{n(n-\sqrt{n})}\frac{2n}{\log n} = O\left(\frac{n}{\log n}\right).$$

Thus, the expected number of DCs, θ(log n), is not bounded, and the fraction $$\frac{\log n}{n}$$

of inserted elements tends to zero. In addition, each insertion of a DC into the text will also affect the Huffman tree, but differently than the other characters. While after each new character, a swap or mirror transformation is applied to the Huffman tree, the action taken after a DC is to skip over a small constant number h of bits of the encryption key. Such a choice sets a bound of θ(log n) for the expected total number of bits wasted from the encryption key, which is about the order of the number of bits used for the transformations on the Huffman tree induced by just a few characters of the text. In some embodiments, this arrangement may be immune to CPA attacks, because even if the encoding is applied on the same file and with the same encryption key K, the inserted DCs are likely to be in different positions and will thus produce different disturbances. The formal description is presented in Algorithm 2 below. The input also includes the parameter h for the number of bits to be skipped in case of a DC. Decryption is done by ignoring all DCs as shown in Algorithm 3 below. To remain with the same model in different runs of the encoding algorithm when applied on the same plaintext, the sequences of locations where the DCs are inserted have to be identical, because even a single discrepancy will shift the selected bits of the encryption key K controlling the transformations. However, the probability of producing identical insertion sequences after r processed characters, $$\prod_{i=1}^{r} \frac{\log(i+1)}{ci} < \frac{1}{2^r} - j$$

for some constant j, decreases exponentially with r, and therefore, the probability of two different runs to coincide rapidly tends to zero.

---

Algorithm 2: Generic Crypto-Compression-Encoding

Crypto-Compression-Encode (x$_1$, x$_2$ ... x$_n$, k, 𝒦, h)
1  initialize the model
2  for i ← 1 to n do
3    choose randomly a probability value p
4    if $p < \log\frac{(i+1)}{ci}$ then
5      encode DC according to the current model
6      skip h bits in 𝒦
      encode x$_i$ according to the current model
7    use the encryption key 𝒦 to select k different elements in Σ
    for j ← 1 to k do
8      apply transformation on the model

---

Algorithm 3: Generic Crypto-Compression - Decoding

Crypto-Compression-Decode (y, y$_2$ ... y$_m$, k, 𝒦 h)
1  initialize the model
2  for i ← 1 to m do
3    decode y$_i$ according to the current model
4    if y$_i$ ≠ DC then
5      output y$_i$
6      use the encryption key 𝒦 to select k different elements in Σ
7      for j ← 1 to k do
        apply transformation on the model
8    else
      skip h bits in 𝒦

---

Extension of the Crypto-System to Arithmetic Coding

In some embodiments, the present algorithm provides for using arithmetic coding, as a way that adapts dynamically to the probability of appearance of individual information symbols and is capable of representing a plurality of symbols as a single codeword. Arithmetic coding operates on an initial interval [0; 1), which repeatedly gets narrowed as the plaintext T is being processed. The narrowing operation is a proportional partition of the current interval into sub-fragments according to the probability distribution of the symbols of E. The encoding is any real number within the final interval, which can be selected randomly in order to strengthen the security with negligible loss in compression. Unlike the fixed probability distribution used throughout the process for the interval partition in static arithmetic coding, the adaptive variant updates the frequencies according to the distribution of the characters within the prefix of the plaintext that has already been processed, thus uses dynamic proportions for the corresponding partitions.

Figure 4:
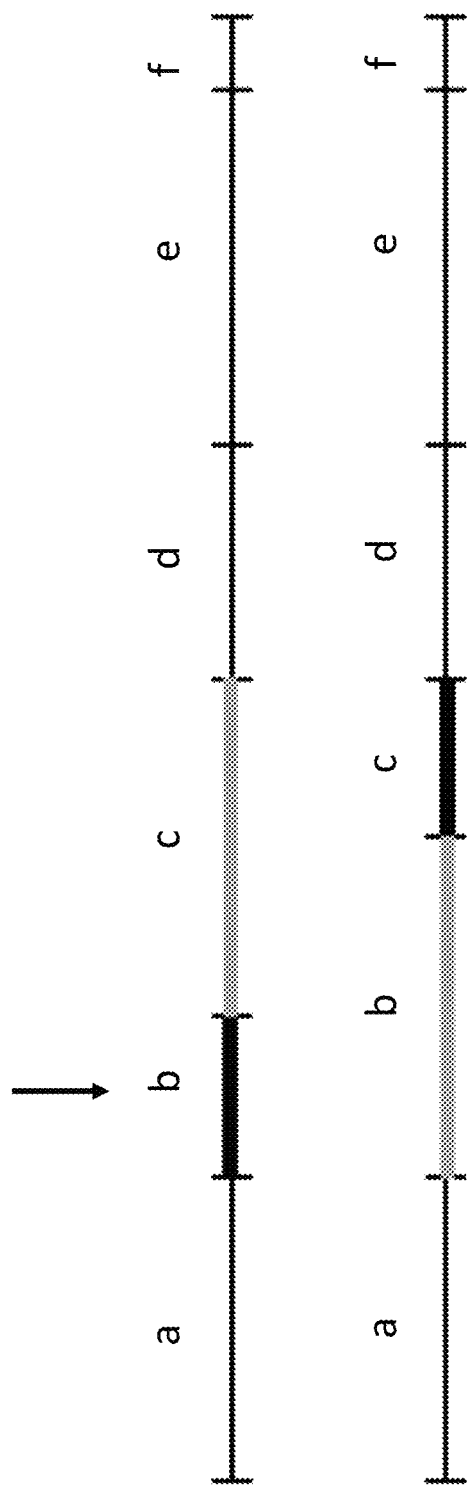
FIG. 4 illustrates swap transformations in arithmetic coding, according to some embodiments of the present disclosure.

Arithmetic coding is more sensitive than Huffman coding to edit operations such as insertion, deletion or swap, even if only a single bit has been altered. This sensitivity is often considered a drawback in case of communication networks, compressed pattern matching, and code synchronization, but shall be regarded as an advantage for cryptographic security applications. In some embodiments, the present algorithm utilizes the sensitivity of arithmetic coding and adapts the Huffman swap operation presented above to the arithmetic interval model, so as to use as few bits as possible of the encryption key for the encryption process. The exact sub-intervals are still selected and altered according to the encryption key, as depicted in FIG. 4, which illustrates swap transformations in arithmetic coding. Specifically, when an interval is selected based on the encryption key, it gets swapped with the sub-interval to its right, and with the first one in case the last sub interval is selected. At first sight, it seems that a swap is a less powerful operation than mirror, because fewer sub-intervals are affected by a single transaction. However. this simple operation can be seen as an approximation of the level-swap of Huffman, rather than the regular swap that is only limited to siblings.

Figure 5B:
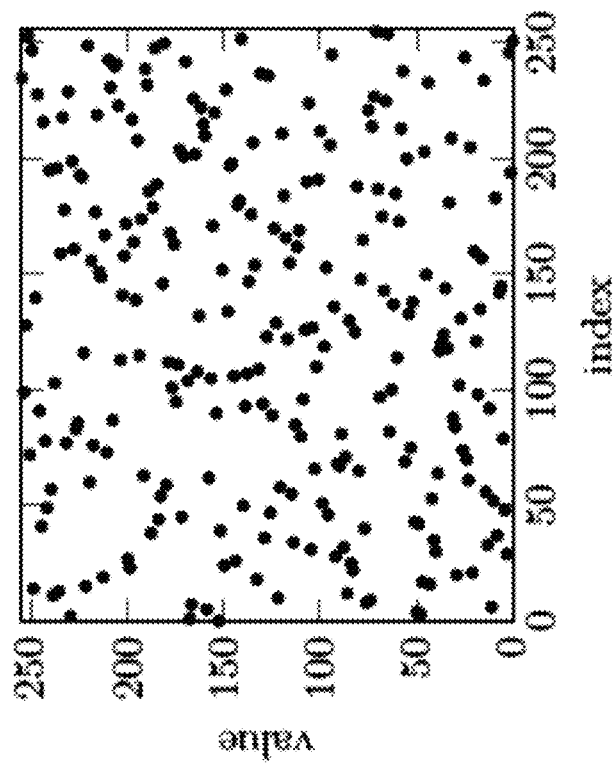
FIGS. 5A-5B illustrate permutations of the lexicographically ordered ASCII alphabet after swaps, according to some embodiments of the present disclosure.
Figure 5A:
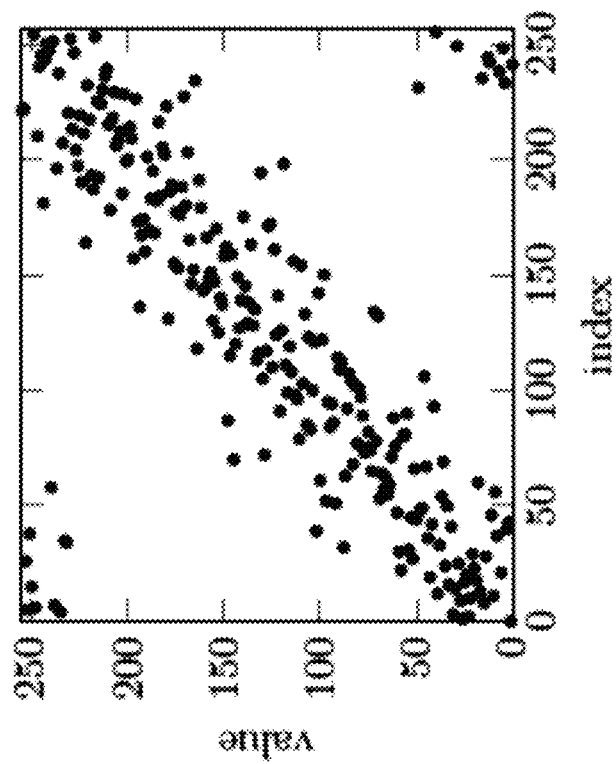

FIGS. 5A-5B illustrate permutations of the lexicographically ordered ASCII alphabet after swaps. As can be seen in FIGS. 5A-5B, even though a swap is a locally limited transformation, its cumulative impact spreads to all positions after a large enough number of iterations, and all permutations are likely to be obtained. Considering an alphabet of 256 characters, simulating the ASCII characters, each represented by its value within 0 to 255. Starting with the identity permutation $\tau(i)=i$, which would be represented by a straight line, FIG. 5A shows the permutations obtained after 100,000 randomly selected single swaps, each element $(i, \pi(i))$ being represented by a dot. FIG. 5B is the corresponding plot after 1M iterations. As can be seen, after a large enough number of iterations, the distribution approaches uniformity. In order to get a numerical estimate for the uniformity of the distribution obtained by single swaps, consider the cyclic distance between i and $\pi(i)$, defined as $$cd(i,\pi(i))=\min(|i-\pi(i)|,\sigma-|i-\pi(i)=|),$$

where $\sigma$ is the size of the alphabet (256 for ascii). Averaging over the $\sigma$ values of i and normalizing by dividing by the maximum $$\frac{\sigma}{2}$$

yields a value $$e = \frac{2cd(i, \pi(i))}{\sigma^2}$$

for which $0 \le e \le 1$ and whose closeness to ½ describes the degree of uniformity of the given permutation $\pi$. The cyclic distance is preferred to the simpler absolute distance $|1-\pi(i)|$ to avoid the extreme fluctuations when a swap is applied at the highest index.

Figure 6:
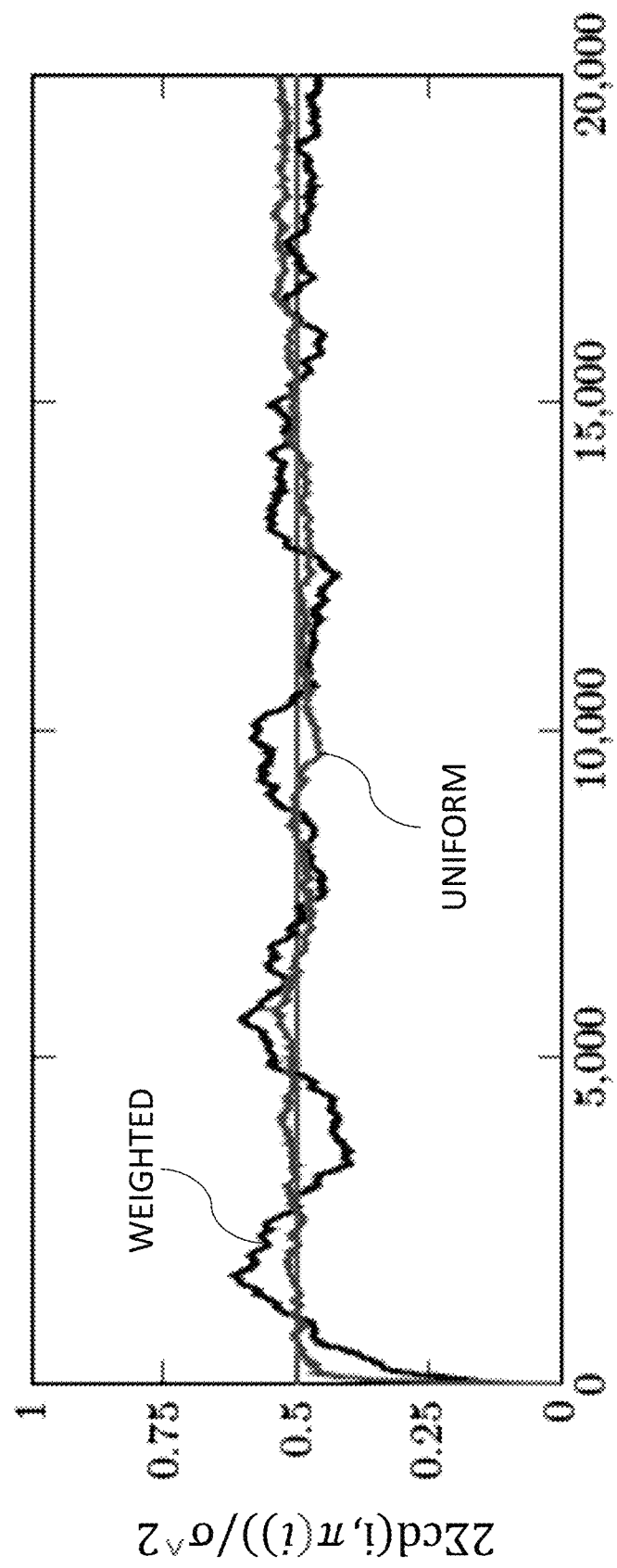
FIG. 6 shows normalized average cyclic distance after applying a sequence of uniform or weighted swaps, according to some embodiments of the present disclosure.

FIG. 6 shows normalized average cyclic distance after applying a sequence of uniform or weighted swaps. The initial permutation is Identity. The line in FIG. 6 marked 'Uniform' shows the value of e as a function of the number of applied randomly chosen swaps for $\sigma=63$, the alphabet size of a sample file used by the present inventors (bible.txt, the King James version of the Bible, of size 4,047,392 Bytes).

The interval to be swapped is selected uniformly from all the intervals according to the encryption key, with no preference to those that represent frequent characters. Such a uniform selection may cause swaps of rare characters that will not affect the obtained ciphertext. To take this non-uniformity into account, one may select the swap position with a probability that depends on the frequency of the chosen character in the input file, so that a character that appears more often in the plaintext will be selected to participate in a swap operation with higher probability than rare characters. To do so, a sufficient number of bits $p_1 p_i+1 \ldots$ of the key $\mathcal{K}$, starting at the current position i in the key are read and treated as a fraction f between 0 and 1, until f uniquely defines one of the intervals of the arithmetic coding partition; the corresponding character is then selected, and the interval is swapped with the adjacent one as before.

In some embodiments, consider the text T=aaaabcde over the alphabet $\Sigma=\{a, b, c, d, e\}$ with frequencies $\{½, ⅛, ⅛, ⅛, ⅛\}$, respectively. Using static Huffman, the character a is encoded four times either as 0000 or as 1111, and only a swap operation that affects a will cause a change in its encoding. In order for a to participate in a swap, either a or the last character of the interval, e.g., e, must be selected, so for a uniform choice, this will happen with probability ⅖. Therefore, the probability of not choosing a for a single swap is ⅗ and $$\frac{3^4}{5} = 0.1296$$

for all four as. On the other hand, if the selection is according to the probability distribution, the probability of not selecting a is ⅜ for a single swap, and $$\frac{3^4}{8} = 0.0198$$

for all four times, which is much less than for a uniform choice. The line in FIG. 6 marked 'Weighted' shows the value of e obtained by such a weighted choice, corresponding to the character distribution of our test file to be described below. As expected, the uniformity of the obtained permutation by using the weighted approach is inferior to that achieved by random swaps. Nevertheless, their impact on the uniformity of the bits in the ciphertext is preferable.

Experimental Results

The present conducted experiments with respect to the bible.txt file. As a first test of security, any reasonably compressed or encrypted file should consist of a sequence of bits that is not distinguishable from a randomly generated binary sequence. A criterion for such randomness could be that the probability of occurrence, within the compressed file, of any substring of length m bits should be $2^{-m}$, for all $m \ge 1$, that is, the probability for 1 or 0 are both 0.5, the probabilities for 00, 01, 10 and 11 are 0.25, etc. The present inventors tested this fact on encrypted output files for the present algorithm, using the mirror and swap transformations with k equals 1 or 2 for the Crypto-Huffman variant, and for values of m up to 3 for the Bulk-Crypto-Huffman variant.

These experiments were repeated for both static and dynamic variants, and the results are presented in Tables 1 and 2 below, respectively. As can be seen, static Huffman, even though applied on an a-priori randomizing, non-deterministic Huffman tree, is the method whose distribution is the most distant from uniform, while the closest are Bulk-Crypto-Huffman variant and Level-Swap (denoted by Bulk and L-Swap for brevity).

To measure the deviation of the given distribution of the $2^m$ possible bit patterns of length m from the expected uniform distribution also for larger m, a Kullback-Leibler (KL) divergence (see, e.g., S. Kullback and R. A. Leibler. On information and sufficiency. Annals of Mathematical Statistics, 22(1):79-86, 1951), defined for two probability distributions $P=\{p_1, \ldots, p_n\}$ and $Q=\{q_1, \ldots, q_n\}$, as $$D_{KL}(P||Q) = \sum_{i=1}^{n} p_i \log \frac{p_i}{q_i}$$

TABLE 1

Probability of 1-, 2- and 3-bit substrings for the Static Huffman variants.

| bit-string | Original | Mirror-1 | Mirror-2 | Swap-1 | Swap-2 | Bulk | L-Swap |
|---|---|---|---|---|---|---|---|
| m = 1 | | | | | | | |
| 0 | 0.486296 | 0.498453 | 0.498558 | 0.498444 | 0.49845 | 0.498536 | 0.500097 |
| 1 | 0.513704 | 0.501547 | 0.501442 | 0.501556 | 0.50155 | 0.501464 | 0.499903 |
| m = 2 | | | | | | | |
| 00 | 0.224723 | 0.248723 | 0.248936 | 0.248737 | 0.248808 | 0.248913 | 0.250076 |
| 01 | 0.261572 | 0.249730 | 0.249622 | 0.249708 | 0.249642 | 0.249622 | 0.250021 |
| 10 | 0.261572 | 0.249730 | 0.249622 | 0.249708 | 0.249641 | 0.249622 | 0.250021 |
| 11 | 0.252132 | 0.251816 | 0.251820 | 0.251848 | 0.251909 | 0.251842 | 0.249882 |
| m = 3 | | | | | | | |
| 000 | 0.088980 | 0.117362 | 0.117601 | 0.117337 | 0.117540 | 0.122927 | 0.121652 |
| 001 | 0.135743 | 0.131361 | 0.131335 | 0.131399 | 0.131268 | 0.125986 | 0.128424 |
| 010 | 0.133005 | 0.122975 | 0.122919 | 0.122972 | 0.122933 | 0.122833 | 0.121522 |
| 011 | 0.128568 | 0.131361 | 0.126704 | 0.126735 | 0.126708 | 0.126789 | 0.128499 |
| 100 | 0.135743 | 0.131361 | 0.131335 | 0.131399 | 0.131268 | 0.125986 | 0.128424 |
| 101 | 0.125829 | 0.118369 | 0.118288 | 0.118308 | 0.118373 | 0.123637 | 0.121597 |
| 110 | 0.128568 | 0.126755 | 0.126704 | 0.126735 | 0.126708 | 0.126789 | 0.128499 |
| 111 | 0.123564 | 0.125062 | 0.125116 | 0.125113 | 0.125201 | 0.125053 | 0.121384 |

TABLE 2

Probability of 1-, 2- and 3-bit substrings for the Dynamic Huffman variants.

| bit-string | Original | Mirror-1 | Mirror-2 | Swap-1 | Swap-2 | Bulk |
|---|---|---|---|---|---|---|
| m = 1 | | | | | | |
| 0 | 0.495477 | 0.500061 | 0.500091 | 0.500138 | 0.500092 | 0.500034 |
| 1 | 0.504523 | 0.499939 | 0.499909 | 0.499862 | 0.499908 | 0.499966 |
| m = 2 | | | | | | |
| 00 | 0.249532 | 0.249985 | 0.250030 | 0.250074 | 0.250030 | 0.250060 |
| 01 | 0.245944 | 0.250076 | 0.250060 | 0.250074 | 0.250060 | 0.249974 |
| 10 | 0.245944 | 0.250076 | 0.250060 | 0.250074 | 0.250060 | 0.249974 |
| 11 | 0.258579 | 0.249863 | 0.249850 | 0.249798 | 0.249849 | 0.249992 |
| m = 3 | | | | | | |
| 000 | 0.122962 | 0.124964 | 0.124989 | 0.125050 | 0.124989 | 0.125053 |
| 001 | 0.126570 | 0.125022 | 0.125042 | 0.125024 | 0.125042 | 0.125007 |
| 010 | 0.119103 | 0.125012 | 0.125093 | 0.124975 | 0.125093 | 0.124968 |
| 011 | 0.126842 | 0.125063 | 0.124968 | 0.125089 | 0.124968 | 0.125007 |
| 100 | 0.126570 | 0.125022 | 0.125042 | 0.125024 | 0.125042 | 0.125007 |
| 101 | 0.119374 | 0.125054 | 0.125018 | 0.125040 | 0.125018 | 0.124967 |
| 110 | 0.126842 | 0.125063 | 0.124968 | 0.125089 | 0.124968 | 0.125007 |
| 111 | 0.131737 | 0.124800 | 0.124882 | 0.124709 | 0.124882 | 0.124985 |

Figure 7:
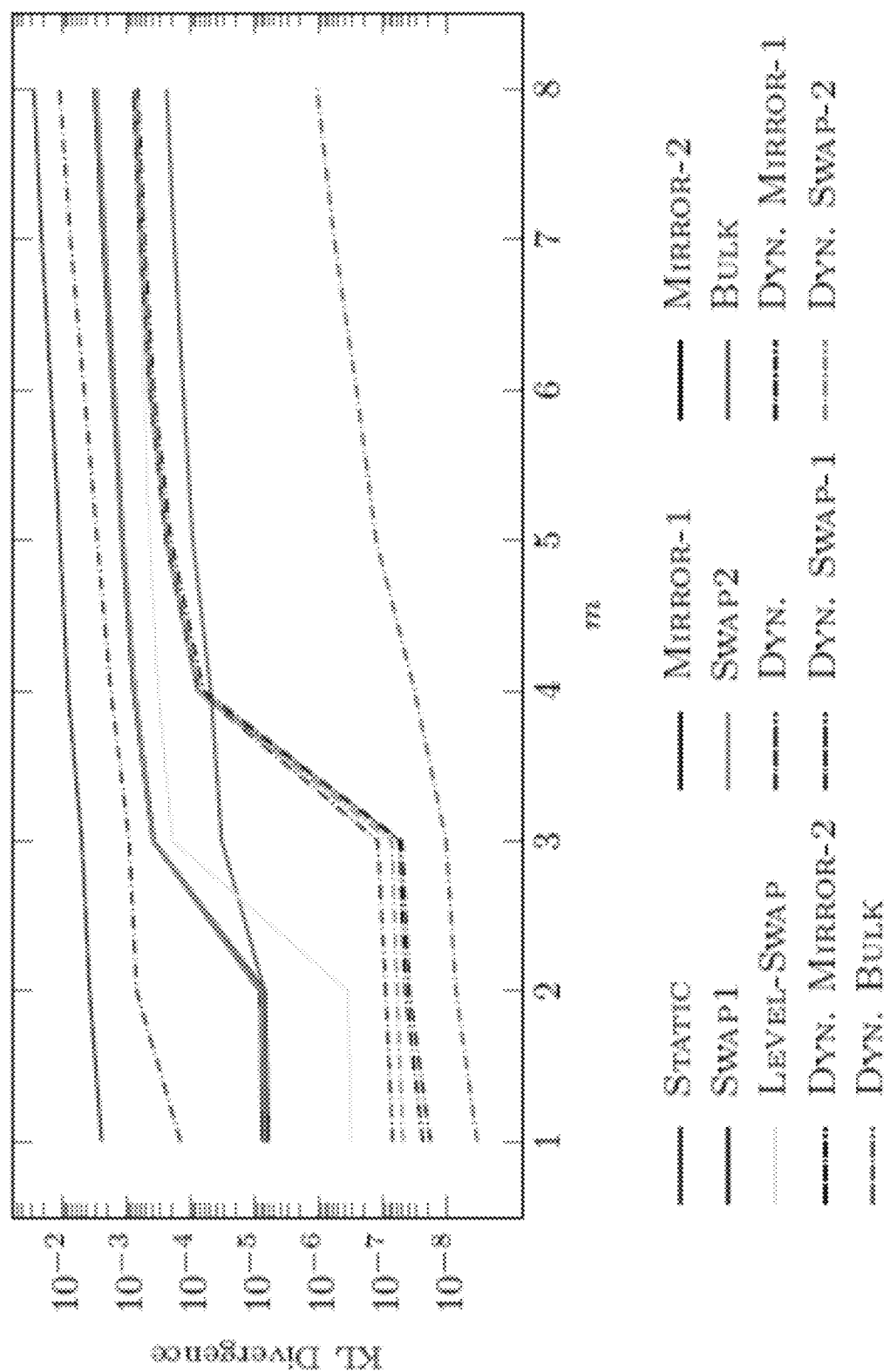
FIG. 7 depicts the values, for m 8, of the KL distance for various Huffman coding variants of the present scheme, in log-scale, according to some embodiments of the present disclosure.
Figure 8:
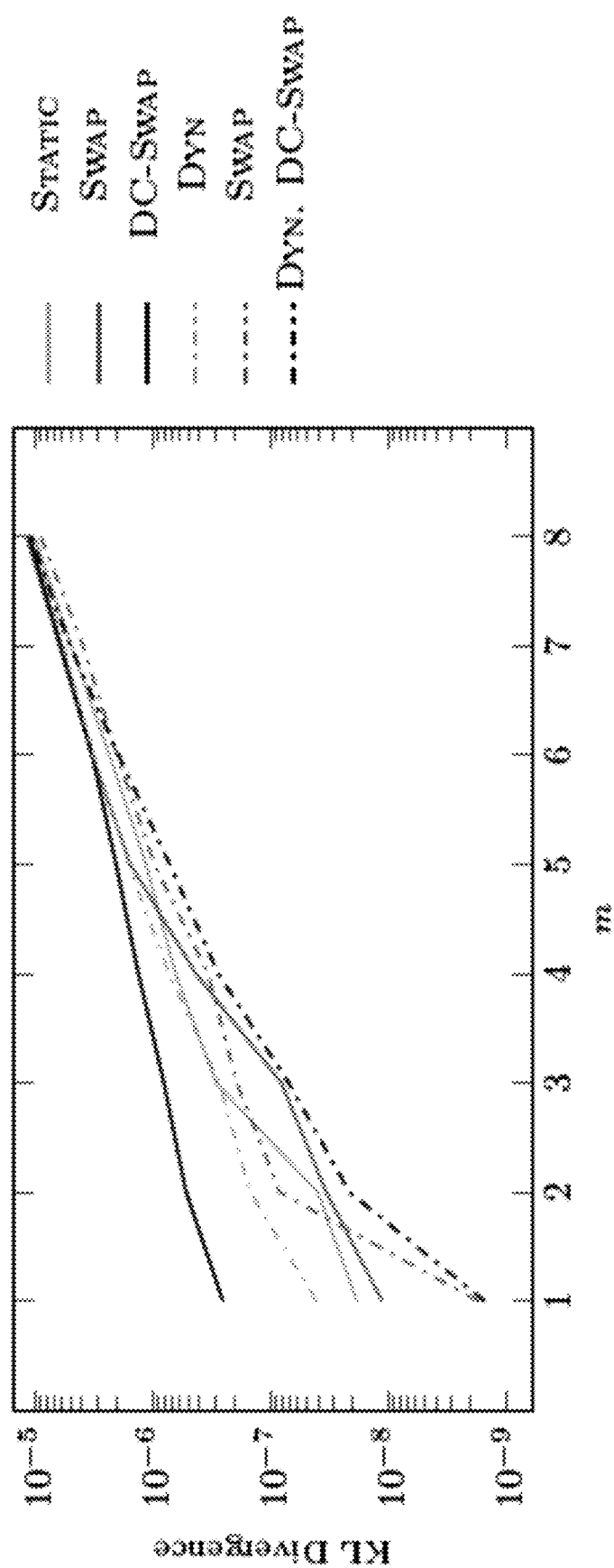
FIG. 8 illustrates KL divergence from the Uniform distribution for arithmetic coding according to some embodiments of the present disclosure.

KL gives a one-sided, asymmetric, distance from P to Q, which vanishes for P=Q. The special case for which the second distribution Q is uniform on $2^m$ elements, $U_{2^m}$= $\{2^{-m}, \ldots, 2^{-m}\}$, therefore $$D_{KL}(P||U_{2^m}) = \sum_{i=1}^{2^m} p_i \log(2^m p_i) = \sum_{i=1}^{2^m} p_i \log p_i + m \sum_{i=1}^{2^m} p_i = m - H(P)$$

where H(P) is the entropy of P. FIG. 7 depicts the values, for m≤8, of the KL distance for various Huffman coding variants of the present scheme, in log-scale. These values are very small, especially when compared to those obtained by the plain static and dynamic Huffman coding without transformations, given in solid and broken lines, respectively. As expected, the values for Bulk were the smallest. The KL evaluation was repeated with arithmetic coding, but this time only the swap operation was used, with and without the additional DCs. The results are shown in FIG. 8, which illustrates KL divergence from the Uniform distribution for arithmetic coding.

The present inventors further tested the sensitivity of the system to variations in the encryption key. The normalized Hamming distance may be used as measure, which is in fact adapted from the measure of similarity between two image files, and has been defined as the normalized number of differing pixels. Thus, given two bit strings A=$a_1 \ldots a_n$ and B=$b_1 \ldots b_m$ with n≥m, B is first extended by zeros so that both strings are of the same length n. The normalized Hamming distance is then defined as $$NHD(A; B) = \frac{1}{n}\sum_{i=1}^{n}(a_i \, xorb_i)$$

Figure 9:
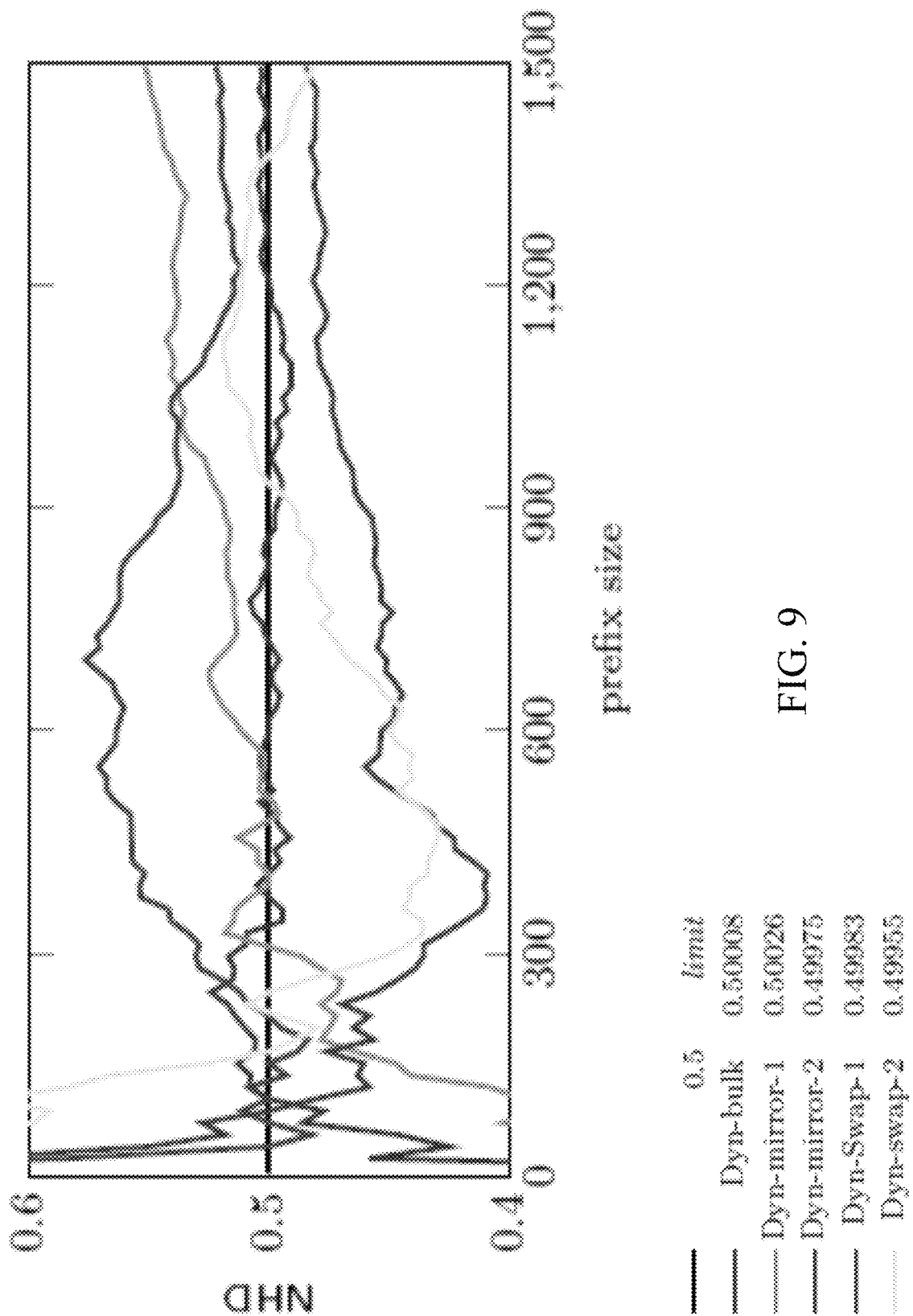
FIG. 9 shows normalized Hamming distance between two runs on the same text with different randomly generated keys $\mathcal{K}_1$ and $\mathcal{K}_2$, with respect to Huffman coding, according to some embodiments of the present disclosure.
Figure 10:
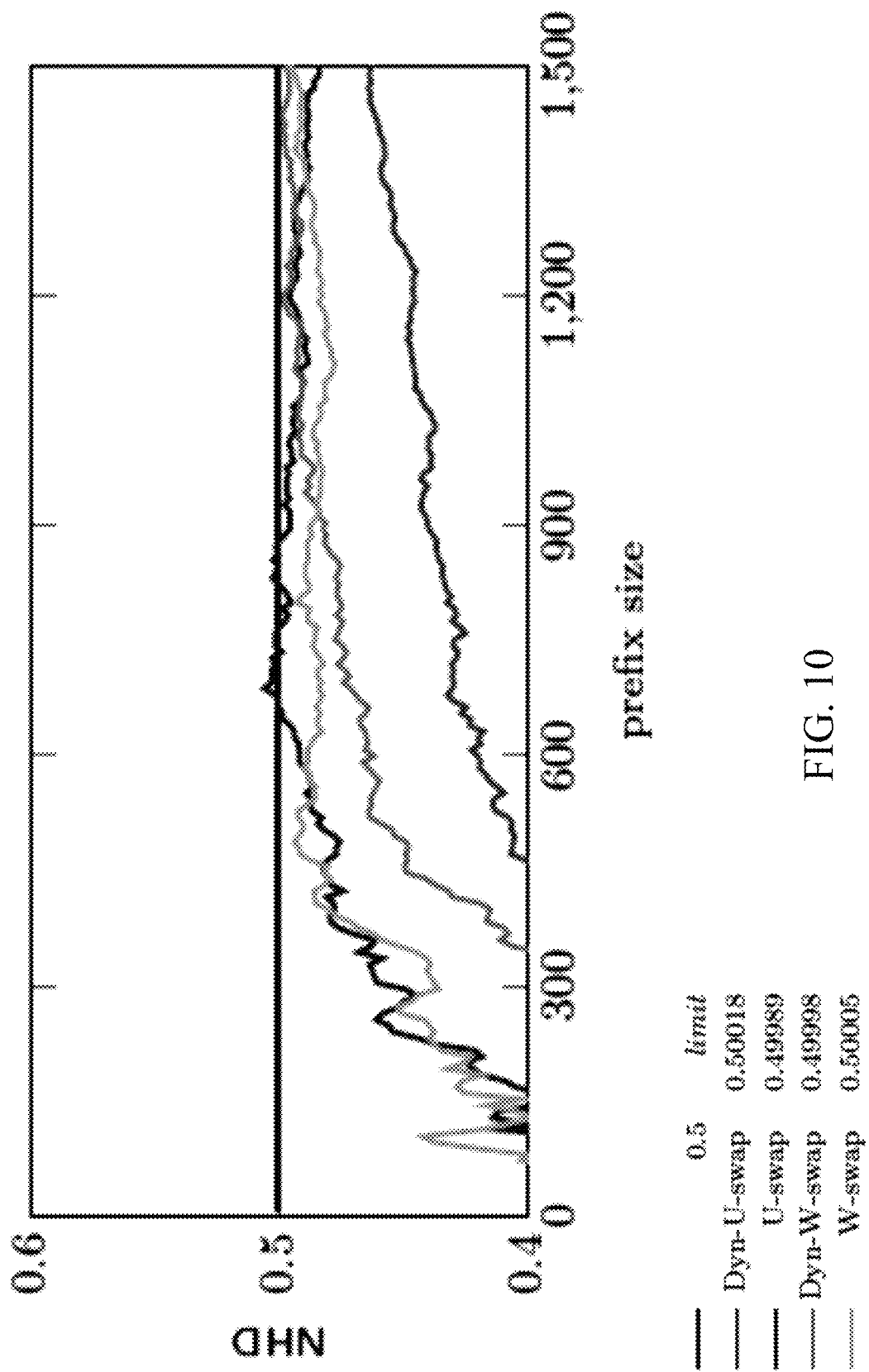
FIG. 10 shows normalized Hamming distance between two runs on the same text with different randomly generated keys $\mathcal{K}_1$ and $\mathcal{K}_2$, with respect to arithmetic coding, according to some embodiments of the present disclosure.

FIGS. 9 and 10 plot these values for prefixes of size n, for 1≤n≤1500 of the file bible.txt.

FIG. 9 shows normalized Hamming distance between two runs on the same text with different randomly generated keys $\mathcal{K}_1$ and $\mathcal{K}_2$, with respect to Huffman coding.

FIG. 10 shows normalized Hamming distance between two runs on the same text with different randomly generated keys $\mathcal{K}_1$ and $\mathcal{K}_2$, with respect to arithmetic coding.

Each line corresponds to a pair of ciphertexts, generated according to two independently generated random keys, for each of our suggested encoding variants. As can be seen, the produced ciphertexts are completely different, with the weighted number of differences in corresponding bits rapidly tending to the expected value ½. The limiting values obtained after processing the entire input file appear to the right of the legend in a column headed limit. We conclude that the proposed crypto-compression procedure is extremely sensitive to even small alterations: all produced files pass the above randomness tests, are practically of the same size, and are completely different from each other, while preserving the compression efficiency.

In order to evaluate the resistance of the presently disclosed compression cryptosystem to CPAs, the present inventors computed the normalized Hamming Distance between two encodings of the same text, using the same key and only differing in the positions where the DC elements have been inserted, for both Huffman and arithmetic coding. There is again convergence towards the expected limit ½, at the price of a negligible hurt in compression efficiency as can be seen in FIGS. 11 and 12.

Figure 11:
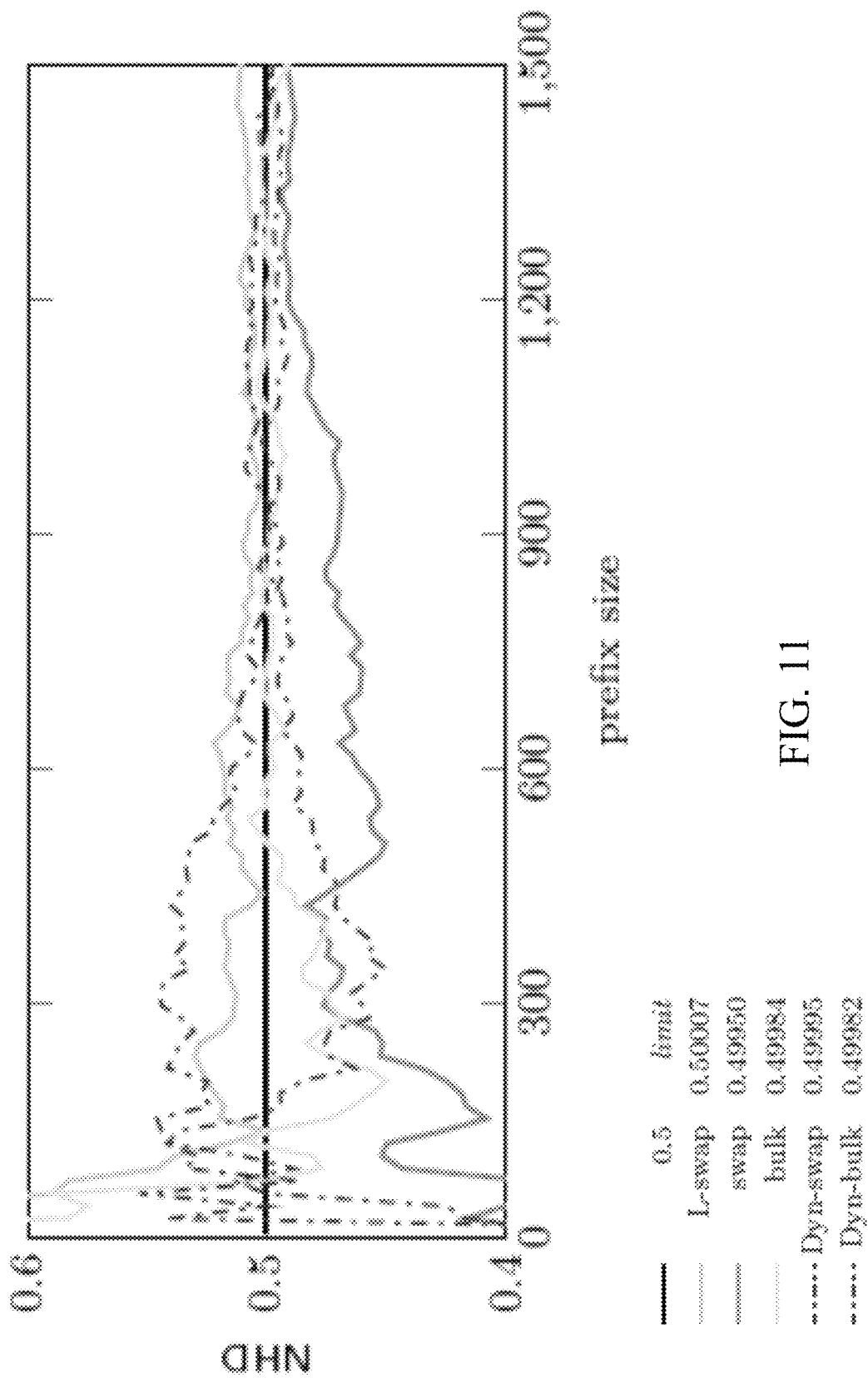
FIG. 11 shows normalized Hamming distance with respect to Huffman coding between two runs on the same text with the same key $\mathcal{K}$, but different locations of the inserted DCs. The number of DCs is about 15 for dynamic and 40 for static, according to some embodiments of the present disclosure.

FIG. 11 shows normalized Hamming distance with respect to Huffman coding between two runs on the same text with the same key $\mathcal{K}$, but different locations of the inserted DCs. The number of DCs is about 15 for dynamic and 40 for static.

Figure 12:
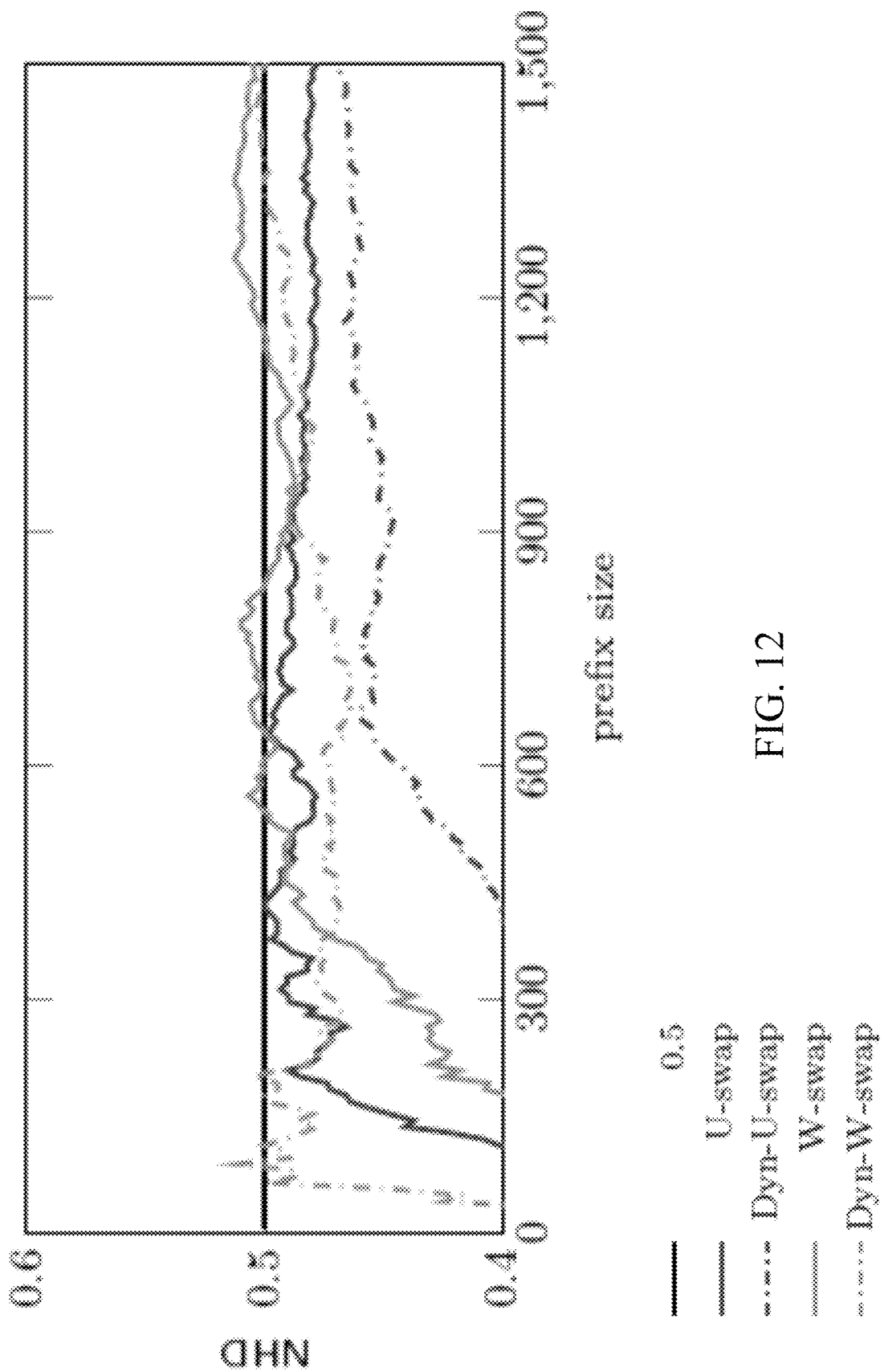
FIG. 12 shows normalized Hamming distance with respect to arithmetic coding between two runs on the same text with the same key $\mathcal{K}$, but different locations of the inserted DCs. The number of DCs is 2, according to some embodiments of the present disclosure.

FIG. 12 shows normalized Hamming distance with respect to arithmetic coding between two runs on the same text with the same key $\mathcal{K}$, but different locations of the inserted DCs. The number of DCs is 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a LAN, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   at least one hardware processor; and
   a non-transitory computer-readable storage medium having stored thereon program instructions, the program instructions executable by the at least one hardware processor to:
   receive, as input, data comprising a plurality of data elements,
   construct a Huffman tree coding representation of said input data based on a known encryption key, wherein said Huffman tree comprises nodes that are compression codes having compression code lengths corresponding to respective occurrence probabilities of said data elements, and wherein said encryption key specifies a subset of said nodes to be selected for an encryption process,
   select said subset of nodes in said Huffman tree for said encryption process, based on said encryption key,
   apply, to each sub-tree of said Huffman tree that is rooted at one of said nodes in said subset, a specified transformation, based on said encryption key,
   generate an output data file based, at least in part, on applying said encryption key on said encryption process; and
   wherein said specified transformation is a level-swap transformation, comprising applying swaps to one or more pairs of adjacent nodes within a same level of the Huffman tree, wherein said one or more pairs of adjacent nodes are not siblings.

2. The system of claim 1, wherein said Huffman tree is constructed in a non-deterministic way.

3. The system of claim 1, wherein said specified transformation maintains a length of a compression code associated with each of said nodes in said subset.

4. The system of claim 1, wherein said selecting is based on pairing said nodes in said subsets with 1-bits in said encryption key.

5. The system of claim 1, wherein a number of said nodes in said subset is selected based, at least in part, on a desired security level of said encryption.

6. The system of claim 1, wherein said data comprises a specified data element which is inserted in said input data in random positions.

7. A method comprising:
   receiving, as input, data comprising a plurality of data elements;
   constructing a Huffman tree coding representation of said input data based on a known encryption key, wherein said Huffman tree comprises nodes that are compression codes having compression code lengths corresponding to respective occurrence probabilities of said data elements, and wherein said encryption key specifies a subset of said nodes to be selected for an encryption process;
   selecting said subset of nodes in said Huffman tree for said encryption process, based on said encryption key;
   applying, to each sub-tree of said Huffman tree that is rooted at one of said nodes in said subset, a specified transformation, based on said encryption key;
   generate an output data file based, at least in part, on applying said encryption key on said encryption process; and
   wherein said specified transformation is a level-swap transformation, comprising applying swaps to one or more pairs of adjacent nodes within a same level of the Huffman tree, wherein said one or more pairs of adjacent nodes are not siblings.

8. The method of claim 7, wherein said Huffman tree is constructed in a non-deterministic way.

9. The method of claim 7, wherein said specified transformation maintains a length of a compression code associated with each of said nodes in said subset.

10. The method of claim 7, wherein said selecting is based on pairing said nodes in said subsets with 1-bits in said encryption key.

11. The method of claim 7, wherein a number of said nodes in said subset is selected based, at least in part, on a desired security level of said encryption.

12. The method of claim 7, wherein said data comprises a specified data element which is inserted in said input data in random positions.

* * * * *